No. 847,583.

PATENTED MAR. 19, 1907.

J. E. KEARNS.
PLOW ATTACHMENT.
APPLICATION FILED JAN. 10, 1907.

Witnesses
John H. Smith
S. K. Bridges

Inventor
John E. Kearns
By Davis & Davis,
Attorneys

UNITED STATES PATENT OFFICE.

JOHN E. KEARNS, OF OTTUMWA, IOWA, ASSIGNOR OF ONE-HALF TO HOKAN S. LINDBERG, OF OTTUMWA, IOWA.

PLOW ATTACHMENT.

No. 847,583.     Specification of Letters Patent.     Patented March 19, 1907.

Application filed January 10, 1907. Serial No. 351,697.

*To all whom it may concern:*

Be it known that I, JOHN E. KEARNS, a citizen of the United States of America, and a resident of Ottumwa, county of Wapello, and State of Iowa, have invented certain new and useful Improvements in Plow Attachments, of which the following is a full and clear specification, reference being had to the accompanying drawing, in which—

Figure 1:
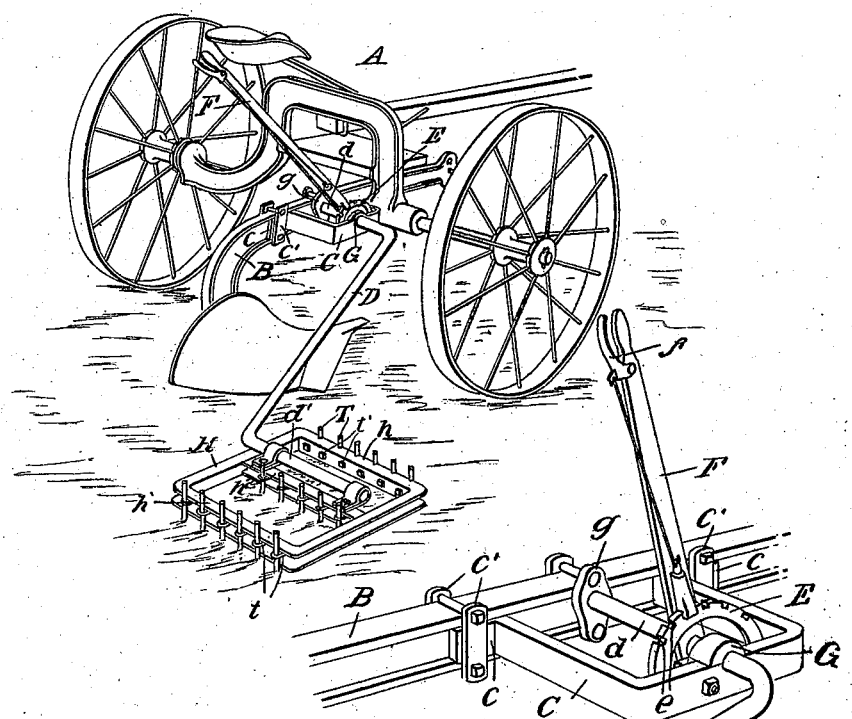
Figure 2:
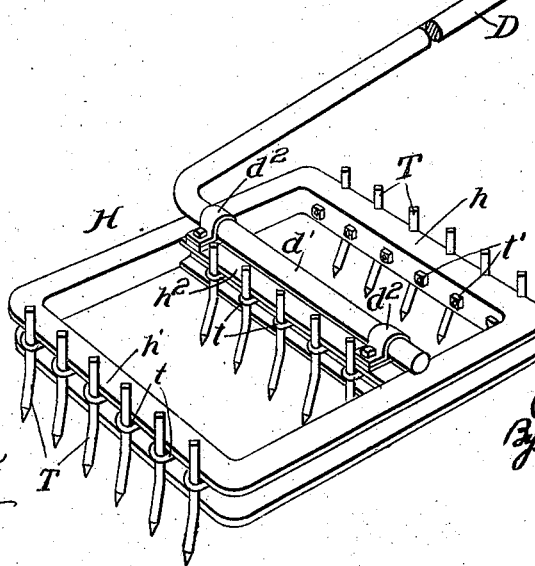

Figure 1 is a perspective view of a wheel-plow provided with my attachment, and Fig. 2 is a detailed enlarged perspective view of the attachment.

The object of this attachment is to permit the ground to be harrowed at the same time that it is plowed, when the ground is moist and friable, and therefore in the best possible condition for easy and thorough pulverization, as more fully hereinafter set forth.

Referring to the drawings by reference characters, A designates a wheeled plow of any ordinary construction, B the beam thereof, and C the horizontally-projecting open bracket clamped to the moldboard side of the plow-beam by means of clips $c'$, adjustably clamped on the beam and serving to clamp the oppositely-projecting feet $c$ of the bracket to the beam. At a point midway between the laterally-projecting arms of the bracket another clip $g$ is adjustably clamped, in the center of which is formed a hole to afford a support and journal for the inner end of the horizontal shaft $d$. The outer end of this shaft portion $d$ is journaled in box G, mounted on the outer end of the bracket.

Affixed to the shaft $d$ is an upright lever F, carrying a spring locking-bolt of the ordinary sort, which may be manipulated by the handpiece $f$ and which is adapted to engage in any one of a series of notches $e$, formed in the segment E, which segment is fastened to the outer end of the bracket.

The shaft $d$ at its outer end is bent backward to form the long rod D, and the rear extremity of this rod is bent sharply outward to form a horizontal shaft $d'$. Clips $d^2$ adjustably clamp the harrow-frame H to this shaft portion $d'$. The harrow-frame consists of the channel-iron and comprises parallel side bars and three cross-bars $h$, $h'$, and $h^2$, to which the harrow-teeth are secured. The teeth are angular in cross-section and are clamped in notches formed in the edges of the bars by means of eye or hook bolts $t$, provided with nuts $t'$. The teeth may of course be arranged on the bars in any suitable manner and may be suitably bent and staggered. I prefer that the front row of teeth be bent backwardly to a sharper angle than the middle row and that the middle row have a sharper bend backwardly than the rear row, as that method of arranging the teeth facilitates the passage of the harrow over weeds.

Having thus fully described my invention, what I claim, and desire to secure by Letters Patent, is—

A harrow attachment for riding-plows consisting of a bracket, clips adjustably clamping the bracket against the side of the beam, a clip secured adjustably against the side of the beam midway between the arms of the bracket and provided with a hole, a shaft $d$ having its inner end journaled in said hole in the last-named clip and its outer end journaled on the outer end of the bracket, means for rotating this shaft and locking it in its adjusted positions, said shaft having a rearward rod-like extension, the rear extremity of this extension being bent outwardly, and a harrow-frame secured to this outward extension and carrying suitable harrow-teeth.

In testimony whereof I hereunto affix my signature, in the presence of two witnesses, this 7th day of January, 1907.

JOHN E. KEARNS.

Witnesses:
 D. A. EMERY,
 C. E. BOUDE.